(No Model.)
G. W SOULE.
BRICK HANDLER.
No. 370,565. Patented Sept. 27, 1887.
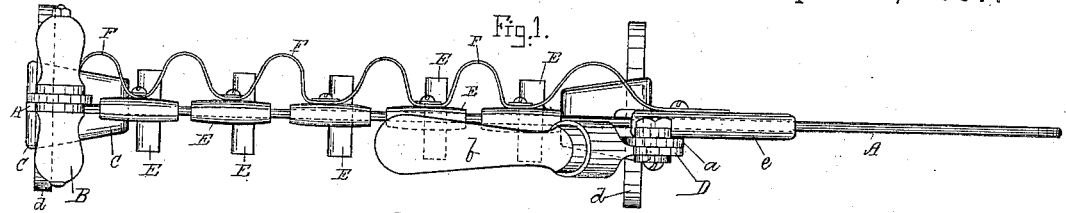
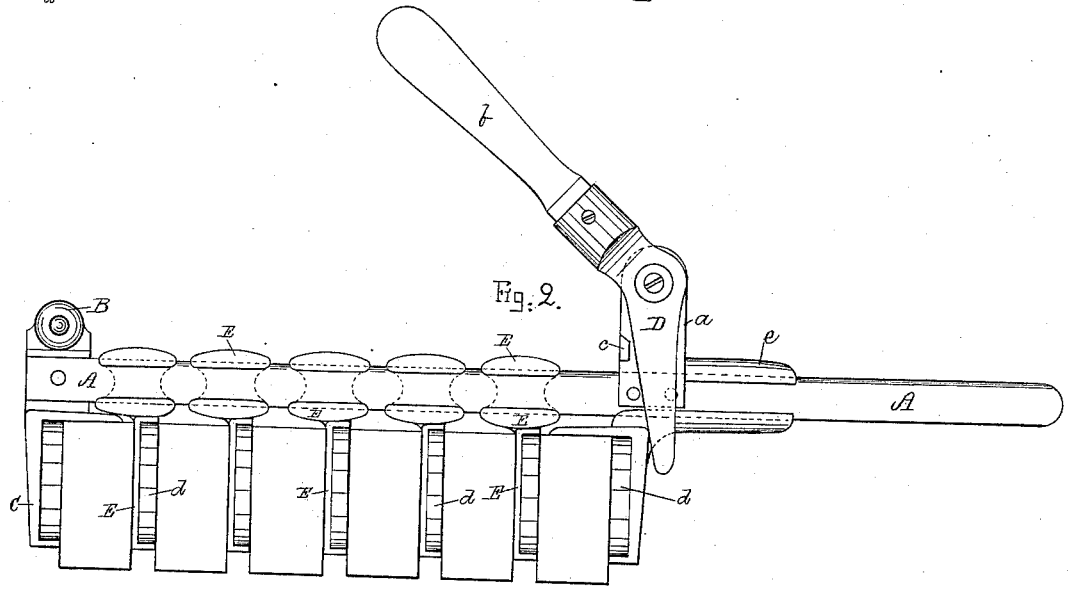
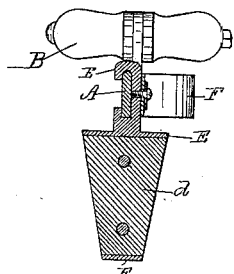
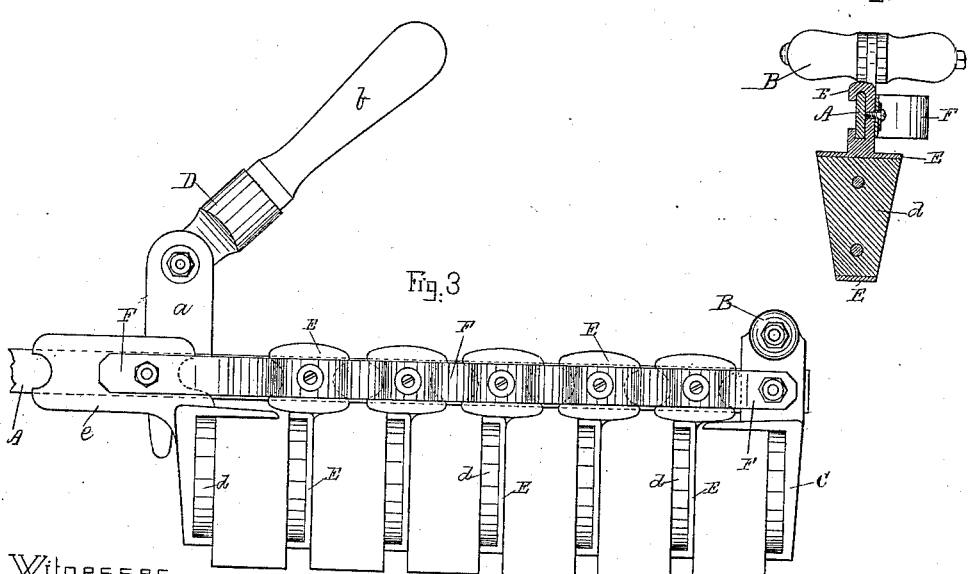
Witnesses
C. W. Thurston
R. B. Torrey
Inventor
George W. Soule,
by Singleton & Piper atty's

UNITED STATES PATENT OFFICE.

GEORGE WASHINGTON SOULE, OF BOSTON, MASSACHUSETTS.

BRICK-HANDLER.

SPECIFICATION forming part of Letters Patent No. 370,565, dated September 27, 1887.

Application filed May 25, 1887. Serial No. 239,368. (No model.)

*To all whom it may concern:*

Be it known that I, GEORGE WASHINGTON SOULE, of Boston, in the county of Suffolk, of the Commonwealth of Massachusetts, have invented a new and useful Improvement in Brick-Handlers; and I do hereby declare the same to be described in the following specification, and represented in the accompanying drawings, of which—

Figure 1 is a top view, Fig. 2 a front elevation, Fig. 3 a rear elevation, and Fig. 4 a tranverse section, of a "brick-handler" embodying my invention, the nature of which is defined in the claims hereinafter presented.

Such brick-handler is to enable an operative in a brick-yard to seize and take up at one and the same time a number of molded bricks, and subsequently transfer them to a place or pile for being dried or otherwise treated. The molds used in molding clay into bricks are generally calculated to mold several at one and the same time, the molded bricks, when discharged from the mold upon a surface, being at equal or substantially equal distances asunder thereon. With the brick-handler constructed as shown in the drawings a workman can pick up at once six of the bricks and carry them to and discharge them at equal and lesser distances apart upon the place or pile where they are to be dried.

In the drawings, A denotes a metallic bar having fixed to it, at one end of it, a handle, B, and also a stationary jaw, C, the latter being extended downward from the bar.

To a standard, a, projecting upward from the front side of the bar there is fulcrumed a clamping-lever, D, provided with a handle, b. Such lever, when the handle is horizontal, bears against an abutment, c, extending from the standard.

Adapted to slide on the bar A lengthwise of it is a series of jaws, E, all of which are arranged at equal distances apart and connected by a leather strap or band, F, which at its rear end is fastened to the bar on its handle. Each jaw has a facing, d, of wood or other suitable material, inserted within and fixed to it, such facings being arranged as represented.

The outermost jaw of the series of movable jaws has a handle, e, extending from it at a right angle and adapted to slide on the bar.

To use the brick-handler, an operative, seizing it by its stationary handle, turns it into a vertical position, so as to cause the series of movable jaws to slide on the bar to the extent that the connecting-strap will admit. He next introduces all but the two outer jaws between the molded bricks, in which case the two outside jaws will be alongside of the outer faces of the first and last of the bricks. This having been done, he, with his right hand hold of the handle of the outermost movable jaw, pushes that jaw and the bricks and other movable jaws toward the stationary jaw. Next he grasps the handle of the lever and turns the lever so as to cause it to bear against the outer face of the outermost jaw, and thereby crowd all the bricks and jaws firmly together. In this condition of the bricks and the parts of the handler the operative, by means of the handle, can lift the bricks and transfer them to the pile or place to receive them, and afterward drop them therein at equal distances apart.

For handling brick in manner herein specified the above-described handler is effective of a great saving of labor relatively to what is usually expended in other ways in removing the molded bricks from one to another place.

I claim—

1. The combination of the bar provided at one end with the stationary jaw and handle and at or near its middle with the clamping-lever fulcrumed to a standard projecting upward from it, (the said bar,) with the series of movable jaws and their connecting-band, such movable jaws being arranged at equal distances apart on and fixed to such band and adapted to slide on the bar lengthwise thereof, and the band being fastened at or near its rear end to the said bar, all substantially as set forth.

2. The combination of the stationary jaw and the series of movable jaws provided with facings of wood, and a connecting-band, as described, with the bar, its handle, and the clamping-lever fixed to said bar, all being adapted and arranged substantially and for use as set forth.

GEORGE WASHINGTON SOULE.

Witnesses:
R. H. EDDY,
R. B. TORREY.